United States Patent [19]
Munch

[11] 3,796,934
[45] Mar. 12, 1974

[54] CAPACITOR WITH NON-HALOGENATED IMPREGNANT

[75] Inventor: Ralph H. Munch, Webster Groves, Mo.

[73] Assignee: Monsanto Company, St. Louis, Mo.

[22] Filed: Aug. 16, 1972

[21] Appl. No.: 281,068

Related U.S. Application Data

[63] Continuation of Ser. No. 232,152, March 6, 1972, abandoned.

[52] U.S. Cl................... 317/259, 252/63.7, 252/64, 317/258
[51] Int. Cl............................................... H01g 3/04
[58] Field of Search ........... 317/258, 259; 252/63.7, 252/64

[56] References Cited
UNITED STATES PATENTS

| | | | |
|---|---|---|---|
| 1,769,874 | 7/1930 | Boyer | 252/63.7 |
| 2,410,714 | 11/1946 | Clark | 317/258 X |
| 2,434,540 | 1/1948 | Berberich | 317/258 |
| 3,370,012 | 2/1968 | Robinson | 252/63.7 |

OTHER PUBLICATIONS

Birks; J. B., Modern Dielectric Materials, Reinhold London 1963, pp. 46–48.

*Primary Examiner*—E. A. Goldberg
*Attorney, Agent, or Firm*—William H. Duffey

[57] ABSTRACT

Electrical capacitors are impregnated with liquid dielectric compositions comprising mixtures of diaryl sulfones and halogen-free aromatic organic compounds.

4 Claims, 4 Drawing Figures

3,796,934

CAPACITOR WITH NON-HALOGENATED IMPREGNANT

This is a continuation, of application Ser. No. 232,152, filed Mar. 6, 1972 now abandoned.

BACKGROUND OF INVENTION

1. Field of Invention

The present invention relates to capacitors of the type consisting of wound or stacked alternating conducting layers and dielectric layers enclosed in a sealed case, and to a liquid dielectric composition suitable for impregnating such capacitors.

2. Description of Prior Art

A common type of electrical capacitor comprises a combination of spaced metal foil conductors having interposed therebetween a dielectric sheet which may be paper, polymeric film or a combination of paper and polymeric film. The dielectric sheet material and the interstices within the dielectric sheet and between the dielectric sheet and the conductors are impregnated with a liquid dielectric composition. Such impregnation is essential in order to realize the greatest dielectric strength of the dielectric material.

The preferred dielectric composition for impregnating capacitors has heretofore been polychlorinated biphenyl which has a relatively high dielectric constant and good low temperature properties. Certain of the polychlorinated biphenyls however, have now been discovered to be resistant to natural degradation and, when released into the environment, these materials may enter the life cycle and be potentially harmful to ecology. Even though capacitors are sealed units and escape of the impregnant into the environment can be prevented to a large degree, it has nevertheless become desirable to provide an alternate composition for impregnating capacitors which does not contain potentially harmful polychlorinated biphenyls.

It is accordingly an object of the present invention to provide a dielectric fluid composition for impregnating electrical capacitors which is free of polychlorinated biphenyls. It is a further object of this invention to provide capacitors containing said alternate dielectric fluid composition. Other objects of this invention will be apparent from the ensuing description and claims.

SUMMARY

The compositions of the present invention which are useful as impregnants for capacitors of the type having alternate layers of a metal foil conductor and a sheet of solid dielectric material comprise mixtures of a diaryl sulfone such as tolylxylyl sulfone and a halogen-free aromatic organic compound such as isopropyl biphenyl.

Capacitors containing said compositions may be constructed and impregnated according to standard procedures. The dielectric sheet material interposed between the metal foil conductors may be paper, polymeric film such as polypropylene, or a combination of paper and film. Such capacitors impregnated with the compositions of the present invention are characterized by a low dissipation factor, high dielectric constant and good low temperature performance.

DESCRIPTION OF PREFERRED EMBODIMENTS

Figure 1:
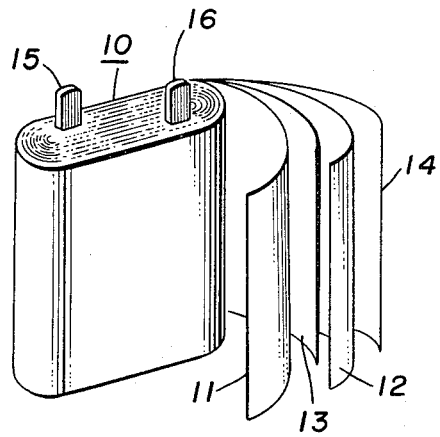
FIG. 1 is a perspective view of a partially uncoiled convolutely wound capacitor.

The diaryl sulfone component of the compositions of this invention preferably comprises from about 10 to about 80 percent by weight of the total dielectric fluid composition. Diaryl sulfones useful in the present invention are those represented by the structure

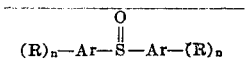

wherein each Ar is individually a phenyl, naphthyl, or indane radical, each R is individually an alkyl radical of 1 to about 8 carbon atoms, and each n is individually an integer of from 0 to 3.

Representative of diaryl sulfones encompassed by the above structure are diphenyl sulfone, ditolyl sulfone, dixylyl sulfone, phenylxylyl sulfone, tolylxylyl sulfone, phenyltolyl sulfone, indane phenyl sulfone, indane tolyl sulfone, indane dinaphthyl sulfone, naphthylphenyl sulfone, naphthylxylyl sulfone, and naphthyltolyl sulfone.

Representative halogen-free aromatic organic compounds suitable for admixture with the diaryl sulfones include aklyl benzene, alkyl naphthalene, alkyl biphenyl, alkyl polyphenyl, alkylaryl ethers and alkyl substituted derivatives thereof, diaryl alkanes and alkyl substituted derivatives thereof, and diaryl ethers and alkyl substituted derivatives thereof, wherein said alkyl groups and alkanes have from 1 to about 20 carbon atoms, said aryl radicals are benzene, naphthalene, biphenyl, or polyphenyl, and said polyphenyls include from 3 to about 5 phenyl groups.

Specific examples illustrative of such halogen-free aromatic organic compounds include $C_{3-4}$ alkyl benzene, cyclohexylethyl benzene, $C_{3-4}$ alkyl naphthalene, $C_{3-4}$ alkyl tetralin, isopropyl biphenyl, cyclohexyl biphenyl, $C_{4-6}$ alkyl phenyl ethers, diphenyl methyl pentane, benzyl ethyl benzene, diphenyl ether, and phenoxybiphenyl.

In addition to the diaryl sulfone and the halogen-free organic aromatic compound, the dielectric fluid composition of this invention may contain minor amounts of numerous other components. In particular, it is often desirable to include a component to act as a stabilizer in the impregnated dielectric system. Generally the purpose of having a stabilizer in the system is to neutralize certain ionizable contaminants or extraneous materials which may be present or which may be formed in the system. Such contaminants may include residual catalyst or catalyst activators which remain from resin forming reactions. Contaminants may also include degradation products caused by environmental or voltage induced chemical reaction in the system. These undesirable contaminants and extraneous products have an adverse effect on the dissipation or power factor of the impregnated dielectric system, and stabilizing agents have been found to be highly effective in maintaining a low power factor in impregnated dielectric systems.

Examples of particularly preferred stabilizing agents are epoxides such as 1-epoxyethyl-3,4-epoxycyclohexane, 3,4-epoxycyclohexylmethyl-3,4-epoxycyclohexane carboxylate, 3,4-epoxy-6-methylcyclohexylmethyl-3,4-epoxy-6-methylcyclohexane carboxylate, and the like. These stabilizers are preferably employed in the dielectric fluid compositions of this invention in amounts in the general range of from 0.001 to about 8 percent by weight, and more preferably from about 0.1 to 3.0 percent by weight.

One particularly preferred dielectric fluid composition of this invention comprises a mixture of from about 10 to 30 percent by weight tolylxylyl sulfone, from about 70 to 90 percent by weight isopropyl biphenyl, and from about 0.1 to 3 percent by weight of 3,4-epoxycyclohexylmethyl-3,4-epoxycyclohexane carboxylate.

The dielectric sheet materials interposed between the conductors in the capacitor and impregnated with the dielectric fluid compositions of this invention may be comprised of a solid flexible porous material such as highly refined cellulose paper, or of a substantially nonporous polymeric film material such as a polyolefin, or of a combination of paper and polymeric film. The paper material is preferably two or more sheets of Kraft capacitor paper having an individual sheet thickness not greater than about 1.0 mil. and preferably about 0.3 mil. and a total combined thickness suitable for the design voltage of the capacitor. Such paper has a dielectric strength which is relatively good as compared to other dielectrics and has a relatively high dielectric constant. The polymeric material is preferably biaxially oriented polypropylene film although other members of the polyolefin family, particularly polyethylene and 4-methylpentene-1 have found some use in capacitor applications. Other useful polymeric materials include polyesters, polycarbonates, polyvinylidene fluoride, and polysulfone. Although either paper or polymeric film may be used alone, combinations of both are often used. The paper is positioned adjacent the polymeric film to function as a wick to pass the dielectric liquid impregnant into the area coextensive with the area of contact between the porous paper and the substantially nonporous polymeric material.

Capacitor devices employing the present invention may have the general structure and configuration as shown in FIG. 1 which is a convolutely wound capacitor 10 comprising separate electrode foils or armatures 11 and 12 and intermediate dielectric spacers 13 and 14. Terminal connectors 15 and 16 have enlarged surfaces (not shown) in contact with electrode foils 11 and 12. Electrode foils 11 and 12 may comprise one or more of a number of different materials, generally metallic and including for example aluminum, copper and stainless steel. Dielectric spacers 13 and 14 generally comprise paper and/or polymeric film as hereinbefore described. More specifically, the dielectric spacer 13 and the metallic electrode foils 11 and 12 taken together comprise a capacitor element structure. The dielectric spacer materials, and the voids within and between the materials and the electrode foils are impregnated with a dielectric fluid composition.

Figure 2:
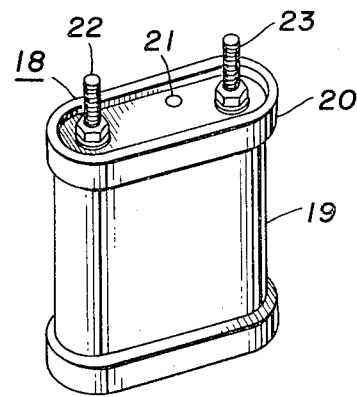
FIG. 2 shows a fully assembled capacitor which contains a convolutely wound capacitor of the type shown in FIG. 1 and a dielectric fluid impregnant.

Referring now to FIG. 2, there is shown an assembled capacitor unit 18 in which is encased a convolutely wound capacitor of the type shown in FIG. 1. The assembled unit includes a container 19, a hermetically sealed cover 20 which includes a small dielectric fluid fill hole 21 and a pair of terminals 22 and 23 projecting through cover 20 and insulated therefrom. Within the container 19 terminals 22 and 23 are connected to terminal connectors 15 and 16 shown in FIG. 1. Although not illustrated, the unit 18 shown in FIG. 2 further includes the dielectric fluid composition which occupies the remaining space in container 19 not occupied by the capacitor element and which also impregnates the dielectric spacers 13 and 14.

The impregnation of the capacitor is accomplished by using conventional procedures. For example, in one general impregnation method, capacitor units encased in assemblies such as capacitor 18 of FIG. 2 are dried under vacuum to remove residual moisture. The drying temperature will vary depending upon the length of the drying cycle but usually ranges from about 60° to 150° C. With too low a temperature, the drying period is excessively long while too high a temperature may cause decomposition of the paper or shrinkage of the polymeric film utilized as the dielectirc spacer. Hole 21 permits moisture to vent from the interior of container 19 during the drying process.

The impregnating dielectric liquid is admitted to the capacitor assembly through hole 21 preferably while the dried assembly is still under vacuum in a suitable evacuated enclosure. The capacitor element in the container must be submerged by the impregnating liquid and usually enough of the impregnating liquid is introduced to completely flood the container and displace all the air therein. The pressure of the enclosure is then raised to atmospheric pressure and the assembly permitted to stand or soak for a number of hours for thorough penetration of the liquid impregnant. After impregnation the capacitor unit may be sealed by applying a quantity of a suitable solder to hole 21 or by other suitable means. The capacitor assembly may thereafter be subjected to an elevated temperature to increase pressure within the capacitor assembly and aid the impregnation process. Heat and pressure may enhance impregnability by changing the relative wettability, viscosity and solubility of materials. In addition, expansion and contraction of individual components of the system which may be the result of heat and pressure may act as a driving force to induce migration of the liquid into the interstices of the dielectric spacer material.

Several capacitors of the type illustrated in FIGS. 1 and 2 were constructed of aluminum foil and paper separators and were impregnated according to the foregoing description with a dielectric composition comprising 23.1 percent tolylxylyl sulfone, 76.6 percent monoisopropyl biphenyl, and 0.3 percent 3,4-epoxycyclohexylmethyl-3,4-epoxycyclohexane carboxylate. A group of eight of these capacitors, designated "Test Capacitors," were subjected to service and life tests. The results of these tests were compared to those obtained with a like group of identical capacitors impregnated in a like manner with an electrical grade polychlorinated biphenyl containing about 42 percent chlorine, designated as "Control Capacitors." Test data is given in Table I.

Life tests were repeated using two other groups of capacitors having biaxially oriented polypropylene film separators instead of paper. The results of these tests are shown in FIG. 2.

TABLE I.—PAPER INSULATED CAPACITORS*

| Life test conditions: | | | | | | | | | |
|---|---|---|---|---|---|---|---|---|---|
| Temp., °C | 22 | 70 | 70 | 70 | 70 | 70 | 80 | 90 | 100 |
| Voltage | 600 | 870 | 900 | 930 | 960 | 1,000 | 1,000 | 1,000 | 1,000 |
| Time, hrs | 0 | 744 | 168 | 168 | 168 | 168 | 168 | 168 | 168 |
| Test capacitors, 8 units: | | | | | | | | | |
| Tan. δ | .00367 | .00347 | .00359 | .00365 | .00359 | .00366 | .00373 | .00412 | .00475 |
| Capacitance, ufd | 1.988 | 1.910 | 1.910 | 1.910 | 1.910 | 1.910 | 1.900 | 1.877 | 1.889 |
| Number of failures | 0 | 0 | 0 | 0 | 0 | 0 | 0 | 0 | 4 |
| Control capacitors, 8 units: | | | | | | | | | |
| Tan. δ | .00351 | .00315 | .00314 | .00316 | .00319 | .00320 | .00336 | .00378 | |
| Capacitance, ufd | 1.974 | .1885 | 1.884 | 1.883 | 1.883 | 1.883 | 1.873 | 1.864 | |
| Number of failures | 0 | 0 | 0 | 0 | 0 | 0 | 0 | 0 | 8 |

* Two sheets of 0.66 mil. Kraft paper.

TABLE II.—FILM INSULATED CAPACITORS*

| Life test conditions: | | | | | | | | | | | |
|---|---|---|---|---|---|---|---|---|---|---|---|
| Temp., °C | 22 | 70 | 70 | 70 | 70 | 70 | 70 | 70 | 70 | 70 | 70 |
| Voltage | 500 | 450 | 500 | 550 | 600 | 650 | 700 | 750 | 800 | 850 | 900 |
| Time, hrs | 0 | 504 | 168 | 168 | 168 | 168 | 168 | 168 | 169 | 120 | 168 |
| Test capacitors, 6 units: | | | | | | | | | | | |
| Tan. δ | .00142 | .00132 | .00128 | .00128 | .00129 | .00142 | .00142 | .00154 | .00162 | .00183 | |
| Capacitance, μfd | 2.411 | 2.321 | 2.320 | 2.318 | 2.315 | 2.314 | 2.312 | 3.310 | 2.309 | 2.305 | |
| Number of failures | 0 | 0 | 0 | 0 | 0 | 0 | 0 | 0 | 0 | 0 | 6 |
| Control capacitors, 6 units: | | | | | | | | | | | |
| Tan. δ | .00119 | .00154 | .00156 | .00156 | .00136 | .00139 | .00127 | .00118 | .00120 | .00128 | |
| Capacitance, μfd | 2.485 | 2.403 | 2.404 | 2.403 | 2.376 | 2.376 | 2.309 | 2.292 | 2.293 | 2.291 | |
| Number of failures | 0 | 0 | 0 | 0 | 2 | 0 | 2 | 1 | 0 | 0 | 1 |

*Two sheets of 0.25 mil. biarially oriented polypropylene film.

The data in Table I and Table II illustrate the excellent performance and reliability of capacitors impregnated with a dielectric fluid composition of this invention as compared to like capacitors of the prior art. In particular, Table I shows there were no failures of the test capacitors until they were subjected to the extreme test conditions of 100° C. and 1,000 volts, and even then the failure rate was only 50 percent after 168 hours at these conditions. The control capacitors, on the other hand, although surviving up to the final test conditions, suffered 100 percent failure at these conditions.

Similar results on relative life stability are seen in Table II. The test capacitors survived intact until subjected to the final test conditions of 70° C. and 900 volts, at which time there was 100 percent failure. In comparison however, the control capacitors began failing midway through the test with only one surviving until the final test stage, at which point it too failed.

It is apparent from the data in Tables I and II that the relative expected life and reliability of the test capacitors are consistently greater than those of the control capacitors for both paper and film insulated capacitor construction. Similar results are obtained using a combination of paper and polymeric film as the dielectric spacer material.

Figure 3:
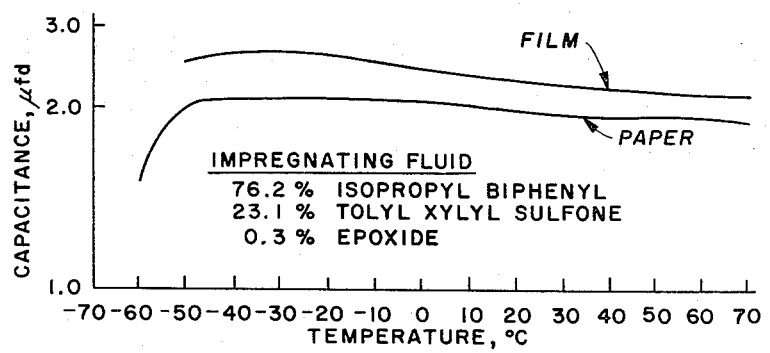
FIG. 3 is a graphical illustration of the effect of temperature on the capacitance of representative film and paper insulated capacitors impregnated with a dielectric composition of this invention.
Figure 4:
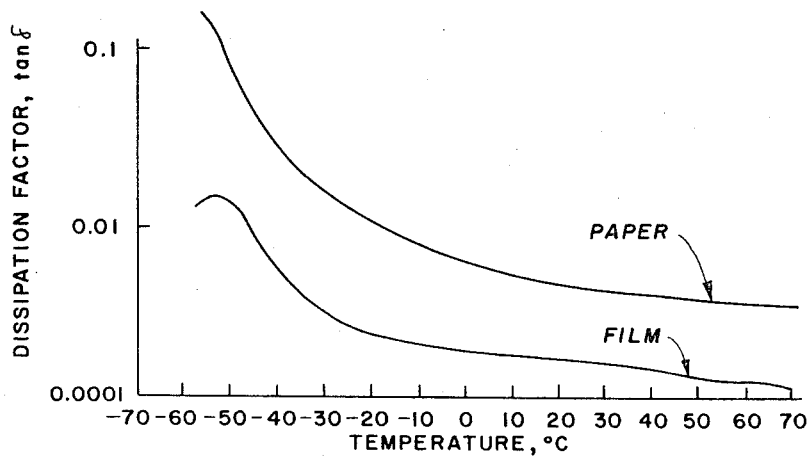
FIG. 4 is a graphical illustration of the effect of temperature on the dissipation factor of representative film and paper insulated capacitors impregnated with a dielectric composition of this invention.

The effect of temperature on the capacitance and dissipation factor of paper and film insulated capacitors identical to those used in the life tests described above was determined over a wide temperature range and is graphically illustrated in FIGS. 3 and 4 of the drawing. As illustrated, the capacitance break for both types of capacitors occurred at about −55° C. The dissipation factors for the paper capacitor measured at 600 volts and film capacitors measured at 500 volts peaked at about −50° C. and −55° C. respectively. The excellent performance obtained at temperatures of −30° C. and below with both the film and paper insulated capacitors is a highly desirable result not generally obtained with the polychlorinated biphenyls where the capacitance break typically occurs at about −30° C. and a dissipation factor peaks at about −40° C.

The preceding examples and data of Tables I and II serve to illustrate a preferred embodiment of the invention, but the invention is not to be limited to the compositions or capacitors defined in these examples. The invention encompasses generically defined dielectric fluid compositions as hereinbefore described, and capacitors containing such compositions. In addition, although the examples and discussions have been directed to capacitors constructed of individual sheets of conductors and insulators, it is understood that metallized film can also be used in conjunction with the dielectric fluid compositions defined herein and capacitors constructed therefrom are included within the scope of this invention. Accordingly, the invention is not to be limited except as defined by the claims appended hereto.

The embodiments of this invention in which an exclusive property or privilege is claimed are defined as follows:

1. An electrical capacitor comprising at least two electrodes and a solid insulating dielectric sheet positioned therebetween, said dielectric sheet and interstices between said dielectric sheet and said electrodes being impregnated with a dielectric liquid composition comprising a mixture of diaryl sulfone and a halogen-free aromatic organic compound selected from the group consisting of alkyl benzene, alkyl naphthalene, alkyl biphenyl, alkyl polyphenyl, alkylaryl ethers and alkyl-substituted derivatives thereof, diaryl alkanes and alkyl-substituted derivatives thereof, and diaryl ethers and alkyl-substituted derivatives thereof wherein said alkyl groups and alkanes have from 1 to about 20 carbon atoms, said aryl radicals are benzene, naphthalene, biphenyl or polyphenyl and said polyphenyls include from 3 to about 5 phenyl groups.

2. A capacitor of claim 1 wherein said dielectric composition comprises from about 10 to 80 percent by weight of a diaryl sulfone represented by the structure

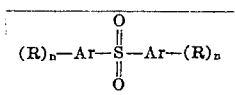

wherein each Ar is individually a phenyl, naphthyl or indane radical, each R is individually an alkyl radical of 1 to about 8 carbon atoms, and each n is individually an integer of from 0 to 3.

3. A capacitor of claim 1 wherein said dielectric fluid composition comprises from about 70 to 90 percent by weight of isopropyl biphenyl, and from about 0.1 to 3 percent by weight of 3,4-epoxycyclohexylmethyl-3,4-epoxycyclohexane carboxylate.

4. A capacitor of claim 3 wherein the solid dielectric sheet is selected from the group consisting of paper, polyolefin film, and combinations thereof.

* * * * *